United States Patent
Chou et al.

(10) Patent No.: US 6,363,428 B1
(45) Date of Patent: Mar. 26, 2002

(54) APPARATUS FOR AND METHOD OF SEPARATING HEADER INFORMATION FROM DATA IN AN IEEE 1394-1995 SERIAL BUS NETWORK

(75) Inventors: Chen-Chi Chou, Milpitas; Bruce Fairman, Woodside, both of CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 0 days.

(21) Appl. No.: 09/241,927

(22) Filed: Feb. 1, 1999

(51) Int. Cl.[7] .............................................. G06F 15/16
(52) U.S. Cl. ...................... 709/232; 709/249; 709/250; 710/107; 710/108
(58) Field of Search ................................ 709/238, 249, 709/250, 232; 710/20, 108, 107

(56) References Cited

U.S. PATENT DOCUMENTS

| | | | |
|---|---|---|---|
| 4,979,185 A | 12/1990 | Bryans et al. ................. 375/20 |
| 5,384,769 A | 1/1995 | Oprescu et al. ................ 370/24 |
| 5,404,459 A | 4/1995 | Gulick et al. ................ 395/275 |
| 5,448,562 A | 9/1995 | Osakabe et al. ........... 370/85.1 |
| 5,450,550 A | 9/1995 | Ito et al. ...................... 395/821 |
| 5,473,727 A | 12/1995 | Nishiguchi et al. ........ 395/2.31 |
| 5,504,585 A | 4/1996 | Fujinami et al. ............ 358/335 |
| 5,509,126 A | 4/1996 | Oprescu et al. ............. 395/307 |
| 5,517,508 A | 5/1996 | Scott ......................... 371/37.1 |
| 5,570,330 A | 10/1996 | Okawa .................... 369/44.32 |
| 5,592,450 A | 1/1997 | Yonemitsu et al. ........... 369/48 |
| 5,596,373 A | 1/1997 | White et al. ................. 348/569 |
| 5,600,664 A | 2/1997 | Hayashi ....................... 371/43 |
| 5,608,730 A | 3/1997 | Osakabe et al. ............ 370/471 |
| 5,619,157 A | 4/1997 | Kumata et al. ............. 327/203 |
| 5,621,725 A | 4/1997 | Kawamura et al. ........... 370/43 |
| 5,710,773 A | 1/1998 | Shiga ......................... 370/512 |
| 5,835,793 A | 11/1998 | Li et al. ...................... 395/898 |
| 5,948,079 A * | 9/1999 | Tsai et al. ...................... 710/20 |
| 5,948,136 A * | 9/1999 | Smyers ....................... 710/107 |
| 6,032,190 A * | 2/2000 | Bremer et al. .............. 709/238 |
| 6,141,385 A * | 10/2000 | Yamaji .................. 375/240.27 |

OTHER PUBLICATIONS

IEEE, "1394–1995 Standard for a High Performance Serial Bus," 1995, USA.
IEC, "61883–1998 Standard for Digital Interface for Consumer Audio/Video Equipment," Parts 1–5, Edition 1.0, Feb. 1998.
Michael Teener, "A Bus on a Diet—The Serial Bus Alternative, An Introduction to the P1394 High Performance Serial Bus," Feb. 24, 1992, pp. 316–320.
R.H.J. Bloks, "The IEEE–1394 High Speed Serial Bus," Jul. 1996, pp. 209–216, Phillips Journal of Research, vol. 50.

* cited by examiner

*Primary Examiner*—Dung C. Dinh
*Assistant Examiner*—Chuong Ho
(74) *Attorney, Agent, or Firm*—Haverstock & Owens LLP

(57) ABSTRACT

An apparatus for and method of separating protocol header information from content data in an IEEE 1394–1995 serial bus network. A receiving node receives isochronous data packets from a transmitting node via a serial bus. Each packet can include a data portion in addition to protocol header information, although not every packet necessarily includes the data portion. Each incoming packet is loaded into a buffer in the receiver as the packet is being received. The protocol header information is removed and stored in sequence in a first block of memory. This is accomplished by placing an input_more direct memory access (DMA) instruction into a next instruction register and, then, executing the instruction. In addition, the receiver is conditioned for removing the data portion from the buffer by loading an input_last DMA instruction into the next instruction register. If examination of the 1394 header information reveals that the packet includes a data portion in addition to the protocol header information, the input_last instruction is executed. This removes the data portion of the packet from the buffer and stores it in sequence in a second block of memory. Upon execution of the input_last instruction, the receiver is conditioned to await a next packet. If the packet does not include a data portion, the input_last instruction is replaced with a no_operation instruction. The no_operation instruction does not initiate any operations. Upon execution of the no_operation instruction, the receiver is conditioned to await a next packet.

32 Claims, 6 Drawing Sheets

APPARATUS FOR AND METHOD OF SEPARATING HEADER INFORMATION FROM DATA IN AN IEEE 1394-1995 SERIAL BUS NETWORK

FIELD OF THE INVENTION

The present invention relates to the field of communicating packetized data between network node devices. More particularly, the present invention relates to the field of communicating packetized data between network node devices in an IEEE 1394–1995 serial bus network.

BACKGROUND OF THE INVENTION

A standard adopted by the Institute for Electrical and Electronics Engineers (IEEE), "IEEE 1394–1995 Standard For A High Performance Serial Bus," is an international standard for implementing an economical high-speed serial bus architecture. This standard provides a universal input/output connection for interconnecting digital devices including, for example, audio-visual equipment and personal computers.

The IEEE 1394–1995 standard supports both asynchronous and isochronous format data transfers. Asynchronous transfers are data transfer operations which transfer data from a source node to a destination node and take place as soon as permitted after initiation. An example of an application appropriate for asynchronous data transfer is communication of a still image or text document. Control commands can also be sent asynchronously.

Isochronous data transfers are real-time data transfers which take place such that time intervals between significant instances have the same duration at both the transmitting and receiving applications. An example of an application suitable for the transfer of data isochronously is the transfer of audio-visual data (AV data) between devices, such as a video camera and a television set. The video camera records sounds and images (AV data) and stores the data in discrete segments on tape. Each segment represents the image and/or sound recorded over a limited period of time. The video camera then transfers each segment in a packetized manner during an appropriate interval for reproduction by the television set.

The IEEE 1394–1995 standard bus architecture provides multiple channels for isochronous data communication between applications. A six-bit channel number is broadcast with the data to allow reception by the appropriate application. This allows multiple applications to concurrently communicate isochronous data across the bus structure without interfering with each other.

The cable required by the IEEE 1394–1995 standard is relatively thin in size compared to other bulkier cables used to connect such devices. The IEEE 1394–1995 cable environment is a network of nodes connected by point-to-point links, each link including a port for each node's physical connection and the cable between them. The physical topology for the cable environment of an IEEE 1394–1995 serial bus is a non-cyclic network of multiple ports, with finite branches. A primary restriction on the cable environment is that nodes must be connected together without forming any closed loops.

Devices can be added and removed from an IEEE 1394–1995 bus while the bus is active. If a device is so added or removed, the bus automatically reconfigures itself for transmitting data between the then existing nodes. A node is considered a logical entity with a unique address on the bus structure. Each node provides an identification ROM, a standardized set of control registers and its own address space.

The IEEE 1394–1995 cables connect ports together on different nodes. Each port includes terminators, transceivers and logic. A node can have multiple ports at its physical connection. The cable and ports act as bus repeaters between the nodes to simulate a single logical bus. The cable physical connection at each node includes one or more ports, arbitration logic, a resynchronizer and an encoder. Each of the ports provide the cable media interface into which the cable connector is connected. The arbitration logic provides access to the bus for the node. The resynchronizer takes received data-strobe encoded data bits and generates data bits synchronized to a local clock for use by the applications within the node. The encoder takes either data being transmitted by the node or data received by the resynchronizer, which is addressed to another node, and encodes it in data-strobe format for transmission across the IEEE 1394–1995 serial bus. Using these components, the cable physical connection translates the physical point-to-point topology of the cable environment into a virtual broadcast bus, which is expected by higher layers of the system. This is accomplished by taking all data received on one port of the physical connection, resynchronizing the data to a local clock and repeating the data out of all of the other ports from the physical connection.

Each isochronous data packet includes at least a 1394 packet header. The packet header includes overhead information necessary for proper communication of the packet. Typically, content data, such as audio-visual data, is included in the packet, in a data field following the packet header. When an isochronous data packet is received, the receiving device must generally separate the header information from the content data so that the content data can be appropriately processed, such as for display. In addition, due to timing considerations, isochronous packets which include only header information and no content data portion are occasionally communicated via an IEEE 1394–1995 bus. The data field may contain a header and audio-visual content data, as when the CIP Transport Protocol is used. This header within the data field is the CIP header. For CIP transport, some data fields contain only the CIP header. This use of a header and data protocol within the data field is referred to as an Isochronous Transport Protocol. A receiver of such isochronous packets cannot necessarily predict when a packet will not include a content data portion until after the 1394 header information is received.

This can cause errors in the processing of isochronous data packets at the receiving device. For example, if the receiving device receives an isochronous data, packet with only a header and no content data portion, but expected the packet to include a data portion, the receiving device will typically process the header portion properly. When the next data packet is received, however, the receiving device will process the header portion for this next packet as content data because the receiving device expected the next received information to be the content data portion of the prior packet.

SUMMARY OF THE INVENTION

The invention is an apparatus for and method of separating protocol header information contained in the data field from content data in an IEEE 1394–1995 serial bus network. A receiving node receives isochronous data packets from a transmitting node of such packets via an IEEE 1394–1995 serial bus. Within the data field, each packet can include a data portion in addition to protocol header information, although not every packet necessarily includes the data portion. The receiving node cannot necessarily predict when a packet does not include a data portion with audio-visual content until after at least a portion of a 1394 packet including the header is received.

Each incoming packet is loaded into a first-in, first-out, (FIFO) buffer in the receiving node as the packet is being received. The protocol header information within the data field is removed and stored in sequence in a first block of memory. This is accomplished by placing an input_more direct memory access (DMA) instruction into a next instruction register and, then, executing the instruction. An address for storing each protocol header is maintained by incrementing an address utilized for storing a previous protocol header an amount corresponding to the length of the previous header. In the preferred embodiment, each protocol header within the data field has an expected length of eight bytes.

In addition, the receiver is conditioned for removing the data portion from the FIFO buffer. This is accomplished by loading an input_last DMA instruction into the next instruction register. If examination of the 1394 header information reveals that the data field includes audio-visual data in addition to the protocol header information, the input_last instruction is executed. This removes the audio-visual data portion of the isochronous packet data field from the FIFO buffer and stores the data portion in sequence in a second block of memory. An address for storing each data portion is maintained by incrementing an address utilized for storing a previous data portion by an amount corresponding to the length of the data portion of a previous packet. In the preferred embodiment, each data portion has an expected length of 480 bytes. Upon execution of the input_last instruction, the receiver is conditioned to await a next incoming isochronous packet.

If, however, examination of the 1394 header reveals that the packet does not include an audio-visual data portion in addition to the protocol header information, the input_last instruction is replaced with a no_operation instruction. The no_operation instruction does not initiate any operations, but rather, serves as a replacement for the input_last instruction. Upon execution of the no_operation instruction, the receiver is conditioned to await a next incoming isochronous packet.

Accordingly, the invention appropriately responds to isochronous packets which contain an audio-visual data portion by receiving such packets and storing the data portion in successive memory locations, before awaiting a next isochronous packet. The packet headers are stored in successive locations separately from the data portions. In addition, the invention appropriately responds to a lack of a data portion in an isochronous packet by receiving and storing the packet protocol header in the stored sequence of packet protocol headers before awaiting a next isochronous packet. Thus, the invention achieves an object of appropriately separating and storing protocol headers and data from received isochronous packets, each in the sequence in which it is received. This object is achieved even when one or more packets do not include a data portion. This object is achieved while minimizing complexity in function and structure in the receiving node.

According to an aspect of the present invention, a method of receiving packetized data and separating protocol header information from content data in the packetized data, wherein not every data packet includes the content data, includes steps of receiving at least a portion of a packet wherein the portion includes at least a protocol header for the packet, determining whether the packet includes content data, and separating the content data from the header if the packet includes the content data. Preferably, the step of separating the content data from the protocol header includes a step of storing the content data in a memory location. The method can also include a step of conditioning a receiving device for separating the content data of the packet from the protocol header, wherein the step of determining is performed after the step of conditioning. The method can also include a step of reversing the step of conditioning the receiving device if the packet does not include the content data. Preferably, the memory location utilized for storing the content data is a next available location adjacent to a memory location utilized for storing content data of a prior packet. The step of reversing the step of conditioning the receiving device can include a step of placing a no operation instruction in a next instruction register included in the receiving device. Preferably, the packet is an isochronous data packet. In addition, the packet is preferably received in accordance with an IEEE 1394 standard.

According to another aspect of the present invention, a method of separating protocol header information from content data for packetized data received from a network segment by a network node wherein not every data packet includes the content data, includes steps of receiving at least a portion of a packet from the network segment into the network node wherein the portion includes at least a protocol header for the packet, removing the protocol header from the portion of the packet, storing the protocol header in a first memory location, conditioning the network node for removing content data of the packet, determining whether the packet includes the content data, removing the content data and storing the content data in a second memory location if the packet includes the content data, and reversing the step of conditioning the network node if the packet does not include the content data. Preferably, the second memory location is a next available location adjacent to a previous content data memory location utilized for storing a content data of a prior packet. In addition, the packet is preferably an isochronous data packet. The first memory location need not be adjacent to the second memory location. Preferably, the first memory location is a next available location adjacent to a previous protocol header memory location utilized for storing a protocol header of a prior packet.

According to yet another aspect of the present invention, a data communication network includes a sending node and a receiving node interconnected by a network segment wherein the sending node is configured for sending data packets to the receiving node and wherein the receiving node separates protocol header information from content data for the data packets received from the sending node via the network segment and wherein not every data packet includes the content data. The receiving node includes a physical layer circuit coupled to the network segment, a buffer coupled to the physical layer circuit to receive at least a portion of the data packet, the portion including at least protocol header information for the data packet, a controller circuit coupled to the buffer to control removal of the portion of the data packet, and an instruction register coupled to the controller circuit to provide instructions to the controller circuit according to a program sequence. The instruction register is conditioned to provide to the controller an instruction which initiates removal of content data from the buffer. The controller circuit determines whether the data packet includes the content data in addition to the protocol header information and when the data packet includes the content data, the controller circuit executes the instruction and when the data packet does not include the content data in addition to the protocol header information, the controller circuit does not execute the instruction. Preferably, the packet is an isochronous data packet. The data communication network can be an IEEE 1394 serial bus. Preferably, the receiving node further comprises a memory. The content data for successive packets are stored in sequential memory locations. In addition, protocol header information for successive packets is preferably stored in sequential memory locations separate from the content data for successive packets.

According to another aspect of the present invention, an apparatus for separating protocol header information from content data for packetized data received from a network segment by a network node wherein not every data packet includes the content data includes means for receiving at least a portion of a packet from the network segment into the network node wherein the portion includes at least a protocol header for the packet, means for removing the protocol header from the portion of the packet, means for storing the protocol header in a first memory location, means for determining whether the packet includes the content data, and means for removing the content data and storing the content data in a second memory location when the packet includes the content data. Preferably, the apparatus also includes means for conditioning the network node for removing content data of the packet. The apparatus can also include means for reversing the conditioning of the network node when the packet does not include the content data. Preferably, the second memory location is a next available location adjacent to a memory location utilized for storing a content data of a prior packet. In addition, the packet is preferably an isochronous data packet. The first memory location need not be adjacent to the second memory location. Preferably, the first memory location is a next available location adjacent to a memory location utilized for storing a protocol header of a prior packet. In addition, the second memory location is a next available location is preferably adjacent to a memory location utilized for storing a content data of a prior packet.

According to still another aspect of the present invention, an IEEE 1394 serial bus network includes a plurality of devices coupled together to communicate isochronous data packets one to another, wherein each data packet includes a protocol header and not every data packet includes content data. The serial bus network includes a transmitting device configured to transmit data packets, an IEEE 1394 serial bus coupled to the transmitting device, and a receiving device coupled to the IEEE 1394 serial bus and configured to receive the data packets transmitted by the transmitting device. The receiving device includes a physical layer circuit coupled to the IEEE 1394 serial bus, a buffer coupled to the physical layer circuit to receive at least a portion of the data packet, the portion including at least a protocol header for the packet, a controller circuit coupled to the buffer to control removal of the portion of the data packet from the buffer, and an instruction register coupled to the controller circuit to provide a next instruction to the controller circuit. The next instruction initiates removal of content data from the buffer. The controller circuit determines whether the data packet includes the content data in addition to the protocol header. If the data packet includes the content data, then the controller circuit executes the instruction and, if the data packet does not include the content data in addition to the protocol header, then the controller circuit does not execute the instruction. The receiving device can include a memory. Content data for successive packets are stored in sequential memory locations. Preferably, protocol headers for successive packets are stored in sequential memory locations separate from the content data for successive packets.

DETAILED DESCRIPTION OF THE PREFERRED EMBODIMENT

Figure 1:
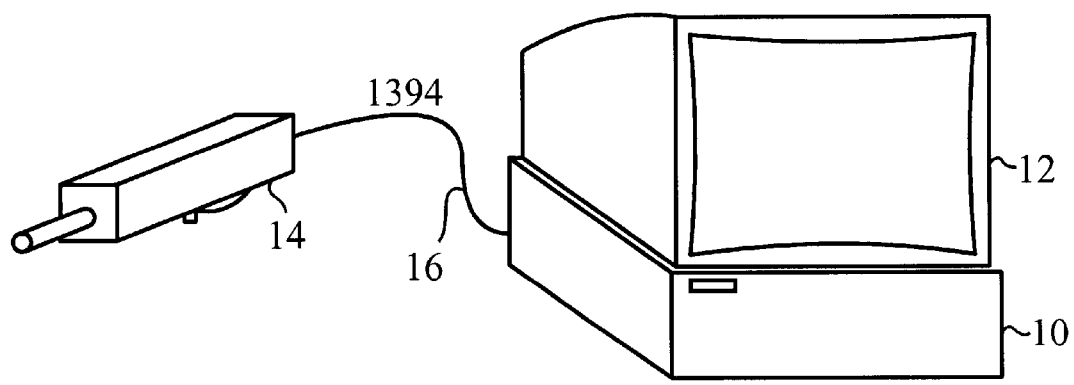
FIG. 1 illustrates a block diagram of an IEEE 1394–1995 serial bus network according to the present invention including a computer system and a video camera.

A block diagram of an exemplary IEEE 1394–1995 serial bus network including a computer system 10 and a video camera 14 is illustrated in FIG. 1. The computer system 10 includes an associated display 12 and is coupled to the video camera 14 by an IEEE 1394–1995 serial bus cable 16. The serial bus cable 16 forms a segment of the network which couples two nodes together, namely, the computer system 10 and the camera 14. The computer system 10 can also include one or more audio speakers. Audio-visual data (AV data) and other associated data are sent between the video camera 14 and the computer system 10 via the IEEE 1394–1995 serial bus cable 16.

Figure 2:
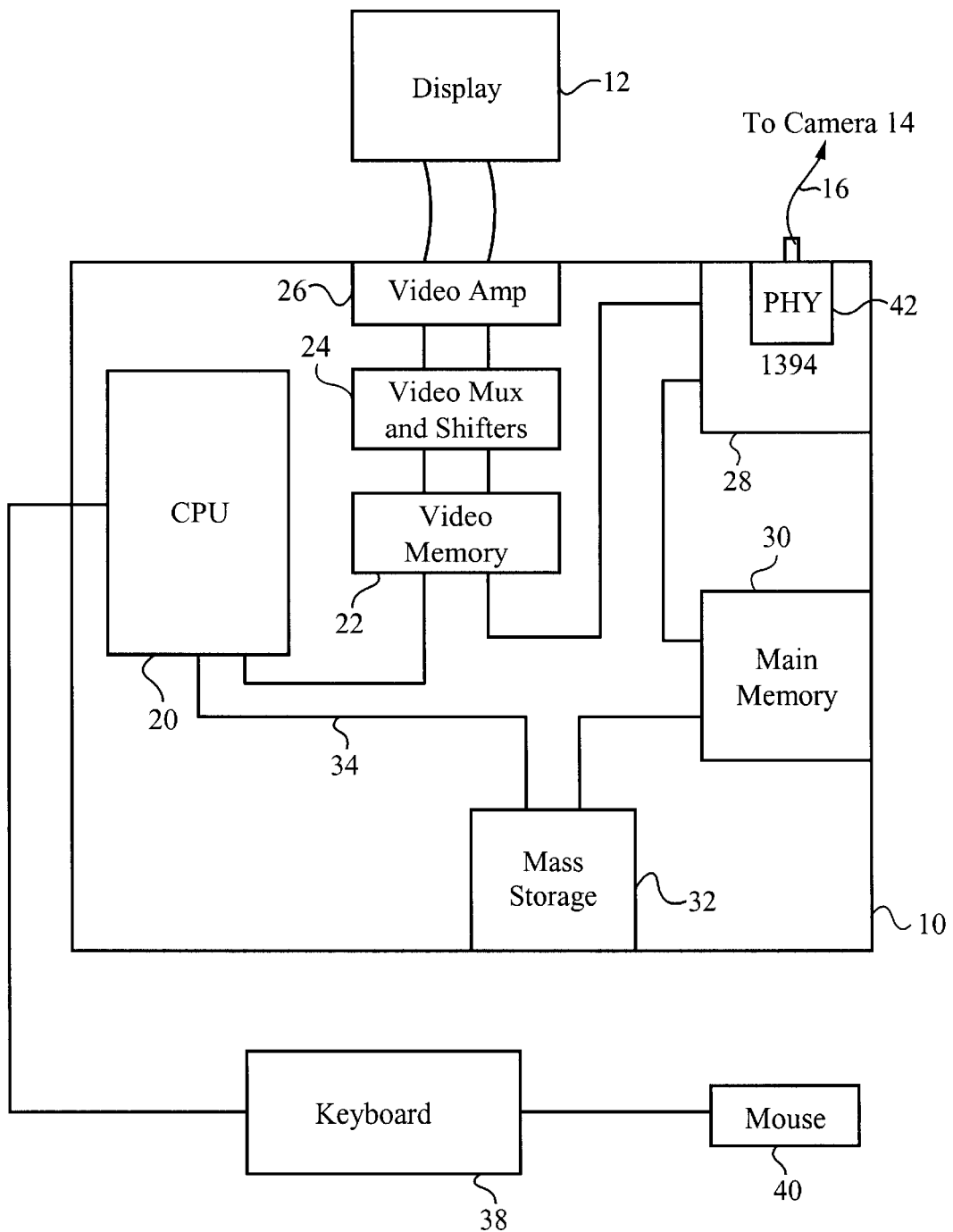
FIG. 2 illustrates a block diagram of internal components of the computer system illustrated in FIG. 1 according to the present invention.

A block diagram of internal components of the computer system 14 is illustrated in FIG. 2. The computer system 10 includes a central processor unit (CPU) 20, a main memory 30, a video memory 22, a mass storage device 32 and an IEEE 1394–1995 interface circuit 28, all coupled together by a conventional bi-directional system bus 34.

The interface circuit 28 includes a physical interface circuit 42 for sending and receiving communications via the IEEE 1394–1995 serial bus. The physical interface circuit 42 is coupled to the camera 14 via the IEEE 1394–1995 serial bus cable 16. In the preferred embodiment of the present invention, the interface circuit 28 is implemented on an IEEE 1394–1995 interface card within the computer system 10. However, it should be apparent to those skilled in the art that the interface circuit 28 can be implemented within the computer system 10 in any other appropriate manner, including building the interface circuit onto the motherboard itself.

The mass storage device 32 may include both fixed and removable media using any one or more of magnetic, optical or magneto-optical storage technology or any other available mass storage technology. The system bus 34 contains an address bus for addressing any portion of the memory 22, 30 and 32. The system bus 34 also includes a data bus for transferring data between and among the CPU 20, the main memory 30, the video memory 22, the mass storage device 32 and the interface circuit 28.

The computer system 10 is also coupled to a number of peripheral input and output devices including a keyboard 38, a mouse 40 and the associated display 12. The keyboard 38 is coupled to the CPU 20 for allowing a user to input data and control commands into the computer system 10. A conventional mouse 40 is coupled to the keyboard 38 as a cursor control device for manipulating graphic images on the display 12.

A port of the video memory 22 is coupled to a video multiplex and shifter circuit 24, which in turn is coupled to a video amplifier 26. The video amplifier 26 drives the display 12. The video multiplex and shifter circuitry 24 and the video amplifier 26 convert pixel data stored in the video memory 22 to raster signals suitable for use by the display 12.

Figure 3:
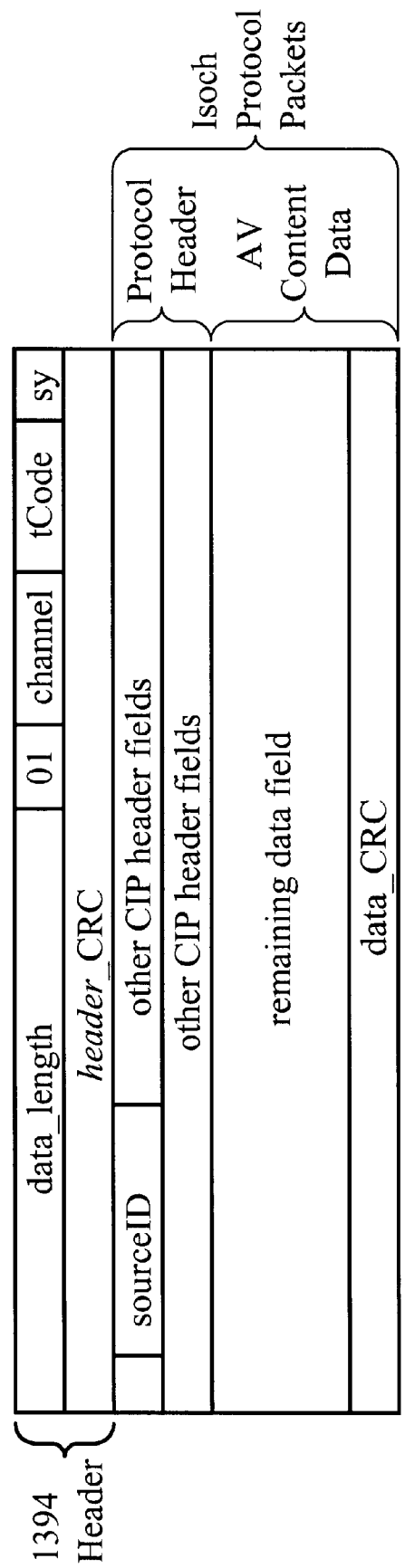
FIG. 3 illustrates a format of an isochronous data packet for transmission over an IEEE 1394–1995 serial bus network.

A format of an isochronous data packet for transmission over an IEEE 1394–1995 serial bus network is illustrated in FIG. 3. The format of the data packet also complies with the ISO/IEC 61883 standard. The 1394 header includes a data_length field, a tag field, a channel field, a tCode field, an sy field and a header_CRC field. The data_length field contains a value representing the number of bytes of data within the data field, including the number of bytes within a CIP (common isochronous packet) header included in the packet. The tag field provides a high level label for the format of data carried by the isochronous packet. In the packet illustrated in FIG. 3, the tag field has a value of "01." The channel field contains the channel number on which the isochronous packet is transmitted. The tCode field contains a transaction code for the packet. For isochronous data packets, the tCode field contains either a value of Ah or Ch. The sy field contains a synchronization flag used in some applications to synchronize the data in the current isochronous packet with some application specific event.

The data field or isochronous protocol packet includes a CIP or protocol header and possibly a content data portion. The CIP header includes a source ID field and other CIP header fields. The sourceID field contains a six bit value representing the physical identifying code of the node which is transmitting the packet. Values in the other CIP header fields depend on the format of the data being transmitted in the packet. The content data portion, if present, contains the content data being transmitted in the packet. Typically, though not necessarily, this data is audio-visual data (AV data).

Figure 4:
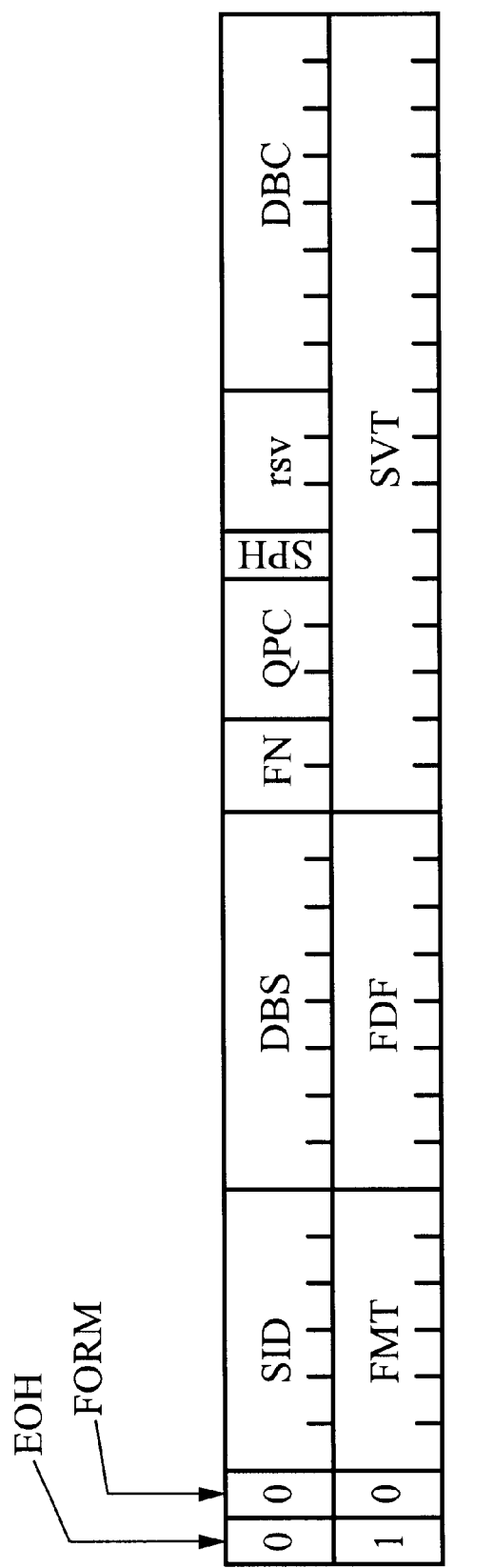
FIG. 4 illustrates a format of the CIP (common isochronous packet) header within an isochronous data packet.

A format of a CIP header of form equal to "00" and including eight bytes, within an isochronous data packet is illustrated in FIG. 4. Within the CIP header, a SID field contains the source node ID value of the transmitting node. A DBS field contains a value representing the size of the data block in quadlets. A FN field contains a fraction number representing the number of data blocks into which a source packet is divided. A QPC field contains a value representing the number of dummy quadlets added to a source packet to equalize the size of the divided data blocks. If the FN field indicates that the source packet is not divided, then the QPC field will contain a value equal to zero. An SPH flag represents whether or not the source packet includes a source packet header. The SPH flag is set equal to a logical "one" when the source packet does include a source packet header. An rsv field is reserved for future extension. A DBC field is a continuity counter of data blocks to detect a loss of data blocks. An FMT field includes a format identifier which identifies the format of the packet. An FDF field is a format dependent field and depends on the format of the packet. An SYT field is used to synchronize the transmitter and the receiver. When transmitting isochronous data over an IEEE 1394–1995 serial bus network, the SYT field may contain a time stamp value for the presentation time of the frame. The receiving node uses this time stamp value to ensure that the data is presented within the correct boundary of time for video data.

Figure 5:
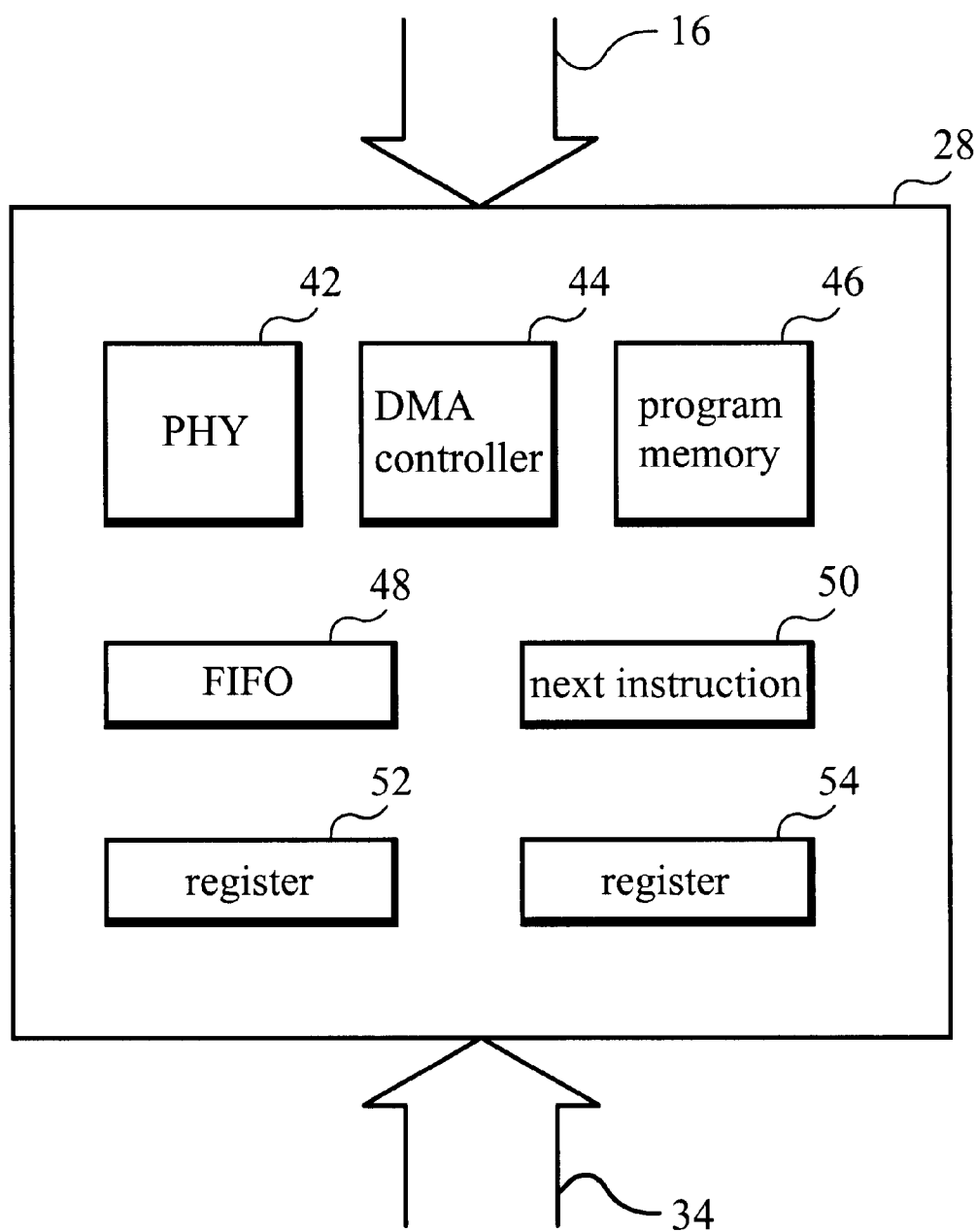
FIG. 5 illustrates a schematic block diagram of the interface circuit illustrated in FIG. 2 according to the present invention.

FIG. 5 illustrates a schematic block diagram of the interface circuit 28 illustrated in FIG. 2. The interface circuit 28 is coupled to the IEEE 1394–1995 serial bus cable 16 and to the system bus 34. The interface circuit 28 includes a physical layer interface circuit 42, a DMA (direct memory access) controller 44, a program memory for the DMA controller 46, a first-in, first-out (FIFO) buffer 48, for receiving packets from the serial bus cable 16 and for providing them to the system bus 34, an instruction register 50, and at least two general purpose registers 52, 54. The instruction register 50 stores a next instruction in a program sequence for execution by the DMA controller 44. The registers 52, 54 are utilized by the DMA controller 44 for temporary storage of operands and memory addresses. It will be apparent that the interface circuit 28 can include one or more additional general purpose registers or FIFO buffers and can include one or more finite state machines for controlling its operation.

Figure 6:
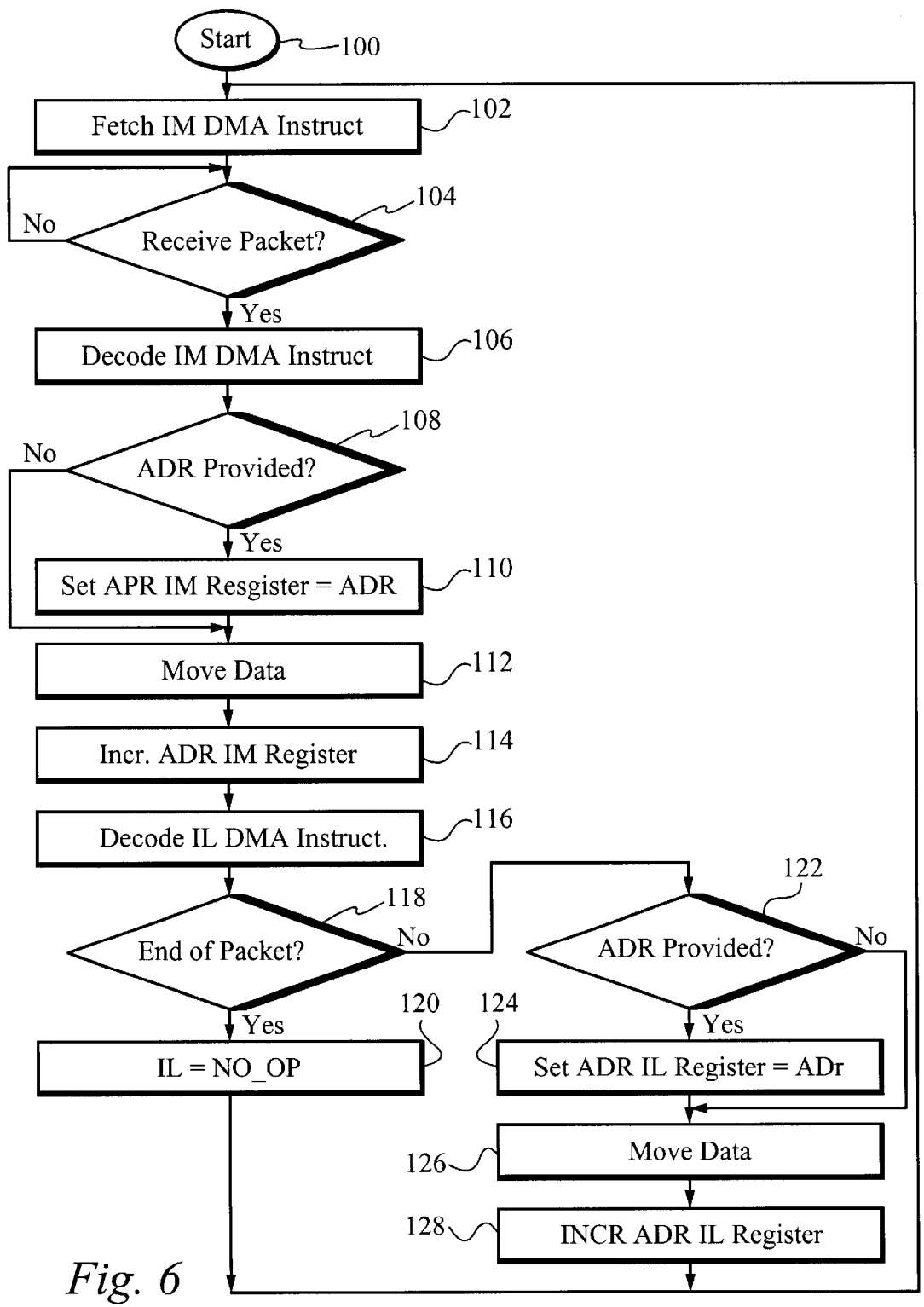
FIG. 6 illustrates a flow diagram for a DMA (direct memory access) channel program execution according to the present invention.

FIG. 6 illustrates a flow diagram for a DMA (direct memory access) channel program execution according to the present invention. This DMA channel program controls operation of the DMA controller 44 (FIG. 5) of the interface circuit 28 (FIGS. 2 and 5) for receiving isochronous data packets, such as the one illustrated in FIG. 3, from the IEEE 1394–1995 serial bus cable 16 (FIGS. 1, 2 and 5). In the preferred embodiment, the DMA channel program is stored in the program memory 46 (FIG. 5).

Referring to FIGS. 5 and 6, upon initiation, such as in response to a reset or power-up event, program flow moves from a start state 100 to an operation block 102. In the operation block 102, an Input_More (IM) DMA instruction is retrieved and loaded from the program memory 46 into the instruction register 50. The Input_More DMA instruction instructs the DMA controller 44 to remove a predefined quantity of data from the FIFO buffer 48 and to store this data in a memory location specified by the address stored in the register 52. Program flow then moves to a decision block 104. At the decision block 104, a determination is made as to whether an isochronous data packet is being received into the FIFO buffer 48 of the interface circuit 28 from the serial bus cable 16. Assuming an isochronous packet is not detected, program flow remains in the decision block 104. Thus, until an isochronous packet is received, the DMA controller 44 remains idle.

When an isochronous data packet is being received by the interface circuit 28, it is received into the FIFO buffer 48. In response to detecting such an incoming isochronous data packet, program flow moves to an operation block 106. In the operation block 106, the Input_More DMA instruction is decoded. It is then determined, at the decision block 108, if an address ADR has been provided with the Input_More DMA instruction. If an address ADR has been provided, then at the operation block 110, the Input_More address value (stored in the register 52) is set to equal the address value ADR. Otherwise, the Input_More address value stored within the register 52 is not changed. Program flow then moves to the operation block 112 where the predefined quantity of data is moved from the FIFO buffer 48 to the Input_More address value stored within the register 52.

Each CIP header has an expected length of eight bytes. The CIP headers are stored in any one (or more) of the memory devices 22, 30 or 32 (FIG. 2). Preferably, the CIP headers for successive packets are stored in successive locations in the main memory 30. In the preferred embodiment, the data which is operated upon in the operation block 112 corresponds to the CIP header for the incoming isochronous data packet. Thus, in the preferred embodiment, the CIP header is placed in a next successive location relative to the CIP header of a prior packet. In addition, the Input_More DMA instruction indicates that another data transfer instruction (e.g. an Input_Last DMA instruction or a No_Op instruction, described herein) for the incoming packet follows. The Input_More memory address stored in the register 52 (FIG. 5) is then incremented in the operation block 114 such that it points to a next available memory address in sequence. Then, program flow moves from the operation block 114 to an operation block 116.

In the operation block 116, an Input_Last DMA instruction is decoded. This instruction is either the Input_Last DMA instruction (if content data follows the CIP header for the packet) or the No_Op instruction (if no content data follows the CIP header for the packet). From the operation block 116, program flow moves to a decision block 118. In the decision block 118, a determination is made as to whether any content data, such as audio-visual data (AV data), is included in the isochronous packet in addition to the CIP header. This determination is made based upon the length of the packet from the contents of the length field of the 1394 isochronous packet header. Note that some isochronous packets expected to be received by the interface circuit 28 do not include any content data following the CIP header. The occurrence of such packets depends upon timing of data transmission by the originator of such packets, such as the video camera 14 illustrated in FIG. 1. Accordingly, the interface circuit 28, which is the receiver of such packets, cannot necessarily predict when a packet which includes a CIP header, but no content data, will occur until after at least the 1394 header portion of the packet is received.

If it is determined that the CIP header is not the end of the packet and a content data portion of the isochronous packet follows the CIP header, then program flow moves from the decision block 118 to a decision block 122. If content data follows the CIP header within the current packet, then the Input_Last DMA instruction is executed. The Input_Last DMA instruction instructs the interface circuit 28 to retrieve the content data for the current isochronous packet from the FIFO buffer 48 and preferably stores the content data into an appropriate location in the memory device 30 (FIG. 2). As will be apparent to those skilled in the art, the content data can alternately be stored in one or more of the memory devices 22, 30 and 32 (FIG. 2).

At the decision block 122, it is determined if an address value ADR has been provided with the Input_Last DMA instruction. If an address value ADR has been provided, then at the operation block 124, the Input_Last address value (stored in the register 54) is set to equal the address value ADR. Otherwise, the Input_Last address value stored within the register 54 is not changed. Program flow then moves to the operation block 126 where the content data is moved from the FIFO buffer 48 to a memory location corresponding to the Input_Last address value stored within the register 54. Then, in the operation block 128, the Input_Last address value, stored in the register 54, is incremented by an amount corresponding to the length of the content data portion of the packet. Accordingly, the memory address stored in the register 54 is incremented such that it points to a next available memory address in sequence.

Alternately, if at the decision block 118 it is determined that the CIP header is the end of the packet and no content data follows the CIP header within the current isochronous packet, then program flow moves from the decision block 118 to an operation block 120. In the operation block 120, the Input_Last instruction is replaced with a No_Op (no operation) instruction in the instruction register 50 within the interface circuit 28 (FIG. 2).

In the preferred embodiment, the content data is 480 bytes. It will be apparent, however, that another length can be selected for the content data and the CIP header. Because, in the operation block 128, the address stored in the register 54 was incremented such that it points to a next available address in sequence, the content data portions of successive packets are, therefore, preferably stored in successive locations of the memory device 30 (FIG. 2). Alternately, as described above, the content data can be stored in any one or more of the memory devices 22, 30 or 32 (FIG. 2). The content data portions of received packets, however, are preferably stored separately from the header portions of the packets. This provides an advantage in that the content data can be further processed for storage, transmittal or display without having to first separate the header information from the content data. After completion of the increment operation at the block 128, program flow then returns to the operation block 102 in order to fetch the next Input_More DMA instruction and be ready to receive the next isochronous packet.

Alternately, if content data does not follow the CIP header within the current packet, then the No_Op instruction is executed in the operation block 120. The No_Op instruction does not initiate any operations, but rather, serves as a replacement for the Input_Last DMA instruction. Note that the memory address in the register 54 is not incremented if no content data follows the CIP header. After execution of the No_Op instruction, at the block 120, program flow returns to the operation block 102 in order to fetch the next Input_More DMA instruction and be ready to receive the next isochronous packet.

Accordingly, the interface circuit 28 (FIGS. 2 and 5) appropriately responds to isochronous packets which contain content data, such as AV data, by receiving such packets and storing the content data in successive memory locations, before awaiting a next isochronous packet. The CIP protocol headers are stored in successive locations separately from the content data. In addition, the interface circuit 28 appropriately responds to a lack of content data in an isochronous packet by receiving and storing the CIP protocol header in the stored sequence of packet headers before awaiting a next isochronous packet. Thus, the invention achieves an object of appropriately separating and storing protocol headers and content data from received isochronous packets, each in the sequence in which it is received. This object is achieved while minimizing complexity of function and structure in the interface circuit 28.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention.

We claim:

1. A method of receiving packetized data and separating protocol header information from content data in the packetized data, wherein not every data packet includes the content data, the method comprising steps of:

a. receiving at least a portion of a packet wherein the portion includes at least a protocol header for the packet;
b. determining whether the packet includes content data; and
c. separating the content data from the header if the packet includes the content data.

2. The method according to claim 1 wherein the step of separating the content data from the protocol header includes a step of storing the content data in a memory location.

3. The method according to claim 2 further comprising a step of conditioning a receiving device for separating the content data of the packet from the protocol header, wherein the step of determining is performed after the step of conditioning.

4. The method according to claim 3 further comprising a step of reversing the step of conditioning the receiving device if the packet does not include the content data.

5. The method according to claim 4 wherein the memory location is a next available location adjacent to a memory location utilized for storing content data of a prior packet.

6. The method according to claim 4 wherein the step of reversing the step of conditioning the receiving device includes a step of placing a no operation instruction in a next instruction register included in the receiving device.

7. The method according to claim 4 wherein the packet is an isochronous data packet.

8. The method according to claim 4 wherein the packet is received in accordance with an IEEE 1394 standard.

9. A method of separating protocol header information from content data for packetized data received from a network segment by a network node wherein not every data packet includes the content data, the method comprising steps of:

a. receiving at least a portion of a packet from the network segment into the network node wherein the portion includes at least a protocol header for the packet;
b. removing the protocol header from the portion of the packet;
c. storing the protocol header in a first memory location;
d. conditioning the network node for removing content data of the packet;
e. determining whether the packet includes the content data;
f. removing the content data and storing the content data in a second memory location if the packet includes the content data; and
g. reversing the step of conditioning the network node if the packet does not include the content data.

10. The method according to claim 9 wherein the second memory location is a next available location adjacent to a previous content data memory location utilized for storing a content data of a prior packet.

11. The method according to claim 9 wherein the packet is an isochronous data packet.

12. The method according to claim 9 wherein the first memory location is not adjacent to the second memory location.

13. The method according to claim 9 wherein the second memory location is not adjacent to the first memory location.

14. The method according to claim 9 wherein the first memory location is a next available location adjacent to a previous protocol header memory location utilized for storing a protocol header of a prior packet.

15. The method according to claim 14 wherein the second memory location is a next available location adjacent to a previous content data memory location utilized for storing a content data of a prior packet.

16. A data communication network including a sending node and a receiving node interconnected by a network segment wherein the sending node is configured for sending data packets to the receiving node and wherein the receiving node separates protocol header information from content data for the data packets received from the sending node via the network segment wherein not every data packet includes the content data, the receiving node comprising:

a. a physical layer circuit coupled to the network segment;
b. a buffer coupled to the physical layer circuit to receive at least a portion of the data packet, the portion including at least protocol header information for the data packet;
c. a controller circuit coupled to the buffer to control removal of the portion of the data packet; and
d. an instruction register coupled to the controller circuit to provide instructions to the controller circuit according to a program sequence wherein the instruction register is conditioned to provide to the controller an instruction which initiates removal of content data from the buffer;

wherein the controller circuit determines whether the data packet includes the content data in addition to the protocol header information and when the data packet includes the content data, the controller circuit executes the instruction and when the data packet does not include the content data in addition to the protocol header information, the controller circuit does not execute the instruction.

17. The data communication network according to claim 16 wherein the packet is an isochronous data packet.

18. The data communication network according to claim 16 wherein the network segment is an IEEE 1394 serial bus.

19. The data communication network according to claim 16 wherein the receiving node further comprises a memory and wherein content data for successive packets are stored in sequential memory locations.

20. The data communication network according to claim 19 wherein protocol header information for successive packets is stored in sequential memory locations separate from the content data for successive packets.

21. An apparatus for separating protocol header information from content data for packetized data received from a network segment by a network node wherein not every data packet includes the content data, the apparatus comprising:

a. means for receiving at least a portion of a packet from the network segment into the network node wherein the portion includes at least a protocol header for the packet;
b. means for removing the protocol header from the portion of the packet;
c. means for storing the protocol header in a first memory location;
d. means for determining whether the packet includes the content data; and
e. means for removing the content data and storing the content data in a second memory location when the packet includes the content data.

22. The apparatus according to claim 21 further comprising means for conditioning the network node for removing content data of the packet.

23. The apparatus according to claim 22 further comprising means for reversing the conditioning of the network node when the packet does not include the content data.

24. The apparatus according to claim 23 wherein the second memory location is a next available location adjacent to a memory location utilized for storing a content data of a prior packet.

25. The apparatus according to claim 24 wherein the packet is an isochionous data packet.

26. The apparatus according to claim 24 wherein the first memory location is not adjacent to the second memory location.

27. The apparatus according to claim 24 wherein the second memory location is not adjacent to the first memory location.

28. The apparatus according to claim 24 wherein the first memory location is a next available location adjacent to a memory location utilized for storing a protocol header of a prior packet.

29. The apparatus according to claim 28 wherein the second memory location is a next available location adjacent to a memory location utilized for storing a content data of a prior packet.

30. An IEEE 1394 serial bus network including a plurality of devices coupled together to communicate isochronous data packets one to another, wherein each data packet includes a protocol header and not every data packet includes content data, the serial bus network comprising:

a. a transmitting device configured to transmit data packets;

b. an IEEE 1394 serial bus coupled to the transmitting device; and c. a receiving device coupled to the IEEE 1394 serial bus and configured to receive the data packets transmitted by the transmitting device, the receiving device comprising:

i. a physical layer circuit coupled to the IEEE 1394 serial bus;

ii. a buffer coupled to the physical layer circuit to receive at least a portion of the data packet, the portion including at least a protocol header for the packet;

iii. a controller circuit coupled to the buffer to control removal of the portion of the data packet from the buffer; and iv. an instruction register coupled to the controller circuit to provide a next instruction to the controller circuit wherein the next instruction initiates removal of content data from the buffer wherein the controller circuit determines whether the data packet includes the content data in addition to the protocol header and if the data packet includes the content data, then the controller circuit executes the instruction, and if the data packet does not include the content data in addition to the protocol header, then the controller circuit does not execute the instruction.

31. The serial bus network according to claim 30 wherein the receiving node further comprises a memory and wherein content data for successive packets are stored in sequential memory locations.

32. The serial bus network according to claim 31 wherein protocol headers for successive packets are stored in sequential memory locations separate from the content data for successive packets.

* * * * *